United States Patent
Schultheiss et al.

(10) Patent No.: US 6,545,722 B1
(45) Date of Patent: Apr. 8, 2003

(54) METHODS AND SYSTEMS FOR PROVIDING TELEVISION RELATED SERVICES VIA A NETWORKED PERSONAL COMPUTER

(75) Inventors: Christopher J. Schultheiss, 419 Qury Assisi St., New Smyrna Beach, FL (US) 32169-3604; Michael A. McCafferty, Dallas, TX (US); Todd D. Cutler, Arlington, TX (US); Sreekrishna V. Sunkavalli, Arlington, TX (US)

(73) Assignees: Douglas G. Brown, Shelby, NC (US); Christopher J. Schultheiss, New Smyrna Beach, FL (US)

( * ) Notice: Subject to any disclaimer, the term of this patent is extended or adjusted under 35 U.S.C. 154(b) by 0 days.

(21) Appl. No.: 09/005,269

(22) Filed: Jan. 9, 1998

(51) Int. Cl.[7] .............................................. H04N 7/173
(52) U.S. Cl. ........................ 348/552; 348/734; 348/906; 725/81; 725/109; 725/51; 345/719
(58) Field of Search .............................. 348/8, 7, 6, 10, 348/12, 13, 552, 734, 906; 455/6.2, 6.3, 5.1; 345/327; 709/217; 725/51, 109, 110, 81, 100; H04N 7/173

(56) References Cited

U.S. PATENT DOCUMENTS

| | | | |
|---|---|---|---|
| 4,706,121 A | 11/1987 | Young | 358/142 |
| 4,751,578 A | 6/1988 | Reiter et al. | 358/183 |
| 4,907,079 A | 3/1990 | Turner et al. | 358/84 |
| 5,014,128 A | 5/1991 | Chen | 358/160 |
| 5,065,425 A | 11/1991 | Lecomte et al. | 379/93 |
| 5,101,499 A | 3/1992 | Streck et al. | 455/4 |
| 5,138,649 A | 8/1992 | Krisbergh et al. | 379/56 |
| 5,192,999 A | 3/1993 | Graczyk et al. | 358/85 |
| 5,249,164 A | 9/1993 | Koz | 358/21 R |
| 5,251,301 A | 10/1993 | Cook | 395/200 |
| 5,283,819 A | 2/1994 | Glick et al. | 379/90 |
| 5,293,357 A | 3/1994 | Hallenbeck | 348/734 |
| 5,339,095 A | 8/1994 | Redford | 345/158 |
| 5,359,367 A | 10/1994 | Stockill | 348/552 |
| 5,396,546 A | 3/1995 | Remillard | 379/96 |
| 5,421,030 A | 5/1995 | Baran | 455/5.1 |
| 5,461,667 A | 10/1995 | Remillard | 379/96 |
| 5,485,221 A | 1/1996 | Banker et al. | 348/563 |
| 5,488,412 A | 1/1996 | Majeti et al. | 348/10 |

(List continued on next page.)

FOREIGN PATENT DOCUMENTS

| | | |
|---|---|---|
| WO | WO 96/17473 | 6/1996 |
| WO | WO 97/48228 | 12/1997 |
| WO | WO 97/48230 | 12/1997 |
| WO | WO 97/49242 | 12/1997 |
| WO | WO 98/03012 | 1/1998 |

OTHER PUBLICATIONS

International Search Report, PCT/US99/00461, Apr. 28, 1999.
U.S. patent application Ser. No. 08/678,772, Schultheiss, filed Jul. 11, 1996.
International Search Report, PCT/US97/12166, Nov. 11, 1997.

Primary Examiner—John Miller
Assistant Examiner—Jean W. Désir
(74) Attorney, Agent, or Firm—Myers Bigel Sibley & Sajovec

(57) ABSTRACT

A set top box is provides that interfaces a television and a personal computer that is connected to the Internet. The set top box includes a wireless remote control receiver that receives user commands from a wireless remote control unit. A radio frequency transceiver that transmits computer commands to the personal computer that is connected to the internet in response to the user commands and that receives data that is generated from the Internet via the personal computer in response to the computer commands. A video processing system that processes the received data for display on a television and a television interface that displays the processed received data on the television.

18 Claims, 25 Drawing Sheets

U.S. PATENT DOCUMENTS

| | | | |
|---|---|---|---|
| 5,570,415 A | 10/1996 | Stetton et al. | 379/110 |
| 5,600,364 A * | 2/1997 | Hendricks et al. | 348/12 |
| 5,606,361 A | 2/1997 | Davidsohn et al. | 348/14 |
| 5,619,251 A | 4/1997 | Kuroiwa et al. | 348/12 |
| 5,636,211 A | 6/1997 | Newlin et al. | 370/465 |
| 5,648,781 A | 7/1997 | Choi | 341/146 |
| 5,675,390 A | 10/1997 | Schindler et al. | 348/552 |
| 5,703,636 A | 12/1997 | Cifaldi | 348/14 |
| 5,706,334 A | 1/1998 | Balk et al. | 379/67 |
| 5,760,824 A | 6/1998 | Hicks, III | 348/14 |
| 5,812,931 A * | 9/1998 | Yuen | 455/5.1 |
| 5,961,603 A * | 10/1999 | Kunkel et al. | 709/229 |
| 5,990,927 A * | 11/1999 | Hendricks et al. | 348/6 |
| 5,999,970 A * | 12/1999 | Krisbergh et al. | 709/217 |
| 6,018,768 A * | 1/2000 | Ullman et al. | 348/12 |
| 6,038,625 A * | 3/2000 | Ogino et al. | 710/104 |
| 6,052,554 A * | 4/2000 | Hendricks et al. | 455/5.1 |
| 6,061,719 A * | 5/2000 | Bendinelli et al. | 709/218 |
| 6,064,440 A * | 5/2000 | Born et al. | 348/478 |
| 6,084,638 A * | 7/2000 | Hare et al. | 348/552 |
| 6,108,696 A * | 8/2000 | Mendhekar et al. | 709/217 |
| 6,128,484 A * | 10/2000 | Singkornrat et al. | 455/420 |

* cited by examiner

FIG. 1C

| Thu | 8:00P | 8:30P | 9:00P |
|---|---|---|---|
| ABC | High Incident | | Murder One |
| CBS | Diagnosis Murder | | Maloney |
| NBC | Friends | Single Guy | Seinfeld |
| FOX | << Major League Baseball Playoffs NLCS Game 7 >> | | |
| SCFI | Star Trek V: The Final Frontier (Sci FI ***) >> | | |
| HBO | << French Kiss (Com ) | Politics | The Net (Sus) >> |
| CNN | Prime News | | Larry King Live >> |
| TBS | << Who's The Man (Com-Dra **) | | National Geographic |
| USA | Murder She Wrote | | Cape Fear >> |
| TWC | Weather Scope | 5-Day Planner | Michelin Driver's |

[ CURRENT ]  [ FAVORITES ]  [ OPTIONS ]    Th 10/10 8:04PM

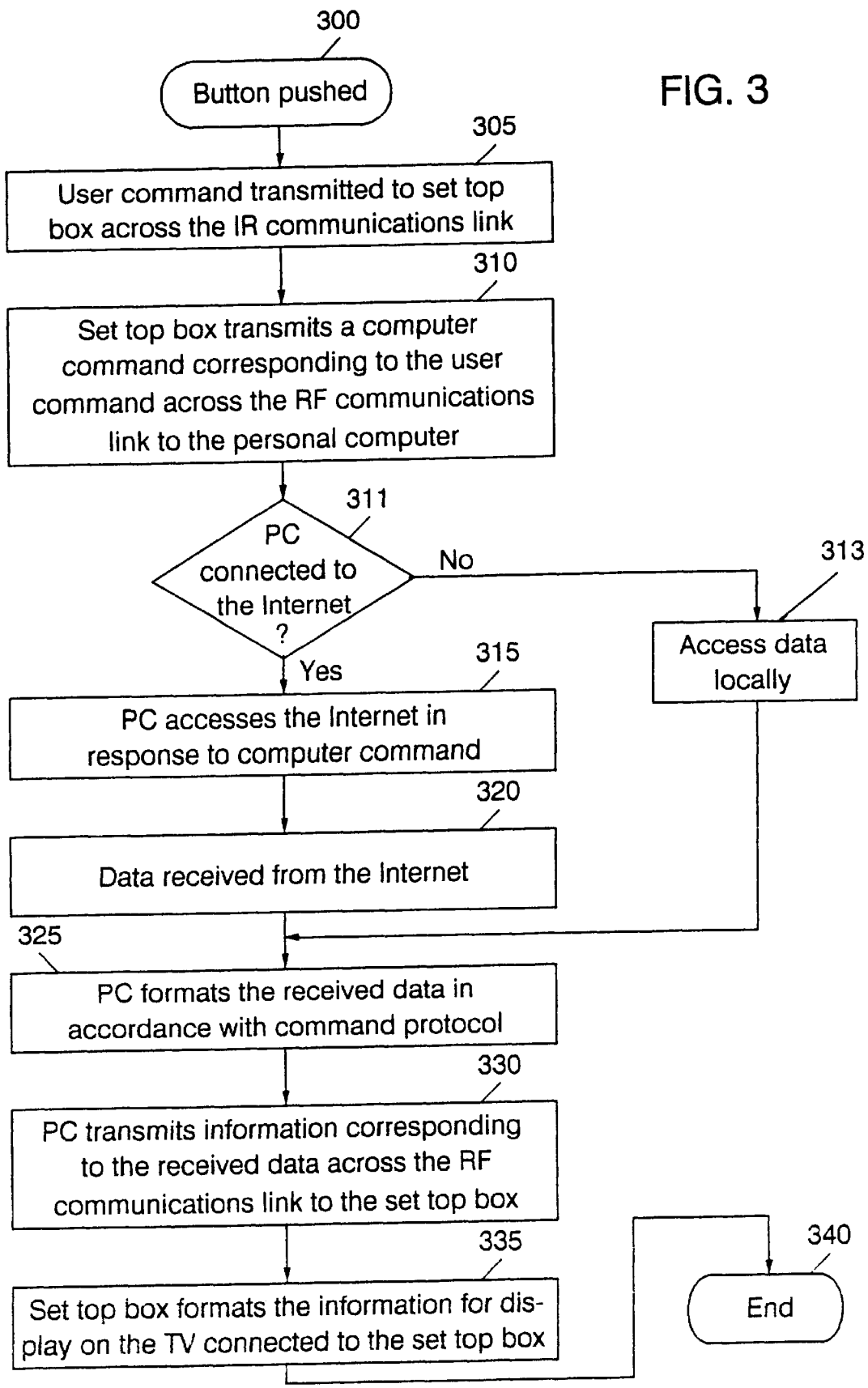

Packet format

| START | ID | INSTR | LENGTH | [DATA] | CKSUM | STOP |
|-------|------|-------|--------|--------|-------|------|
| BYTE  | WORD | BYTE  | WORD   | nBYTES | WORD  | BYTE |

FIG. 4B

CKSUM = the least significant word of the sum of each BYTE contained in: INSTR, LENGTH, DATA
START = the start BYTE, usually 0xFF
STOP  = the stop BYTE, usually 0xFF
ID    = the least significant WORD of the TV BOX serial number
INSTR = the instruction or command to be executed
LENGTH = the length in BYTES of the following data stream
DATA  = any data that may be required for the instruction

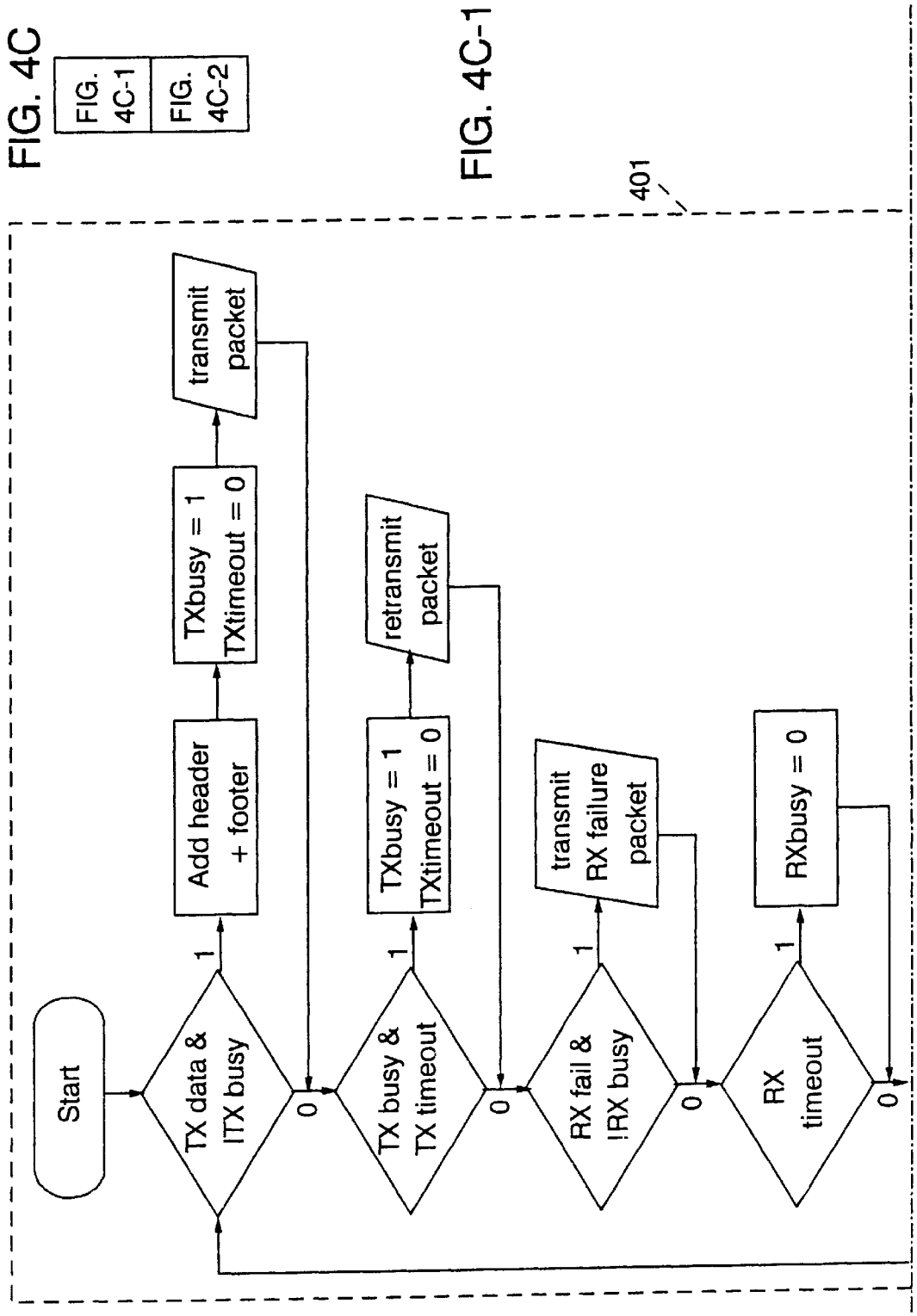

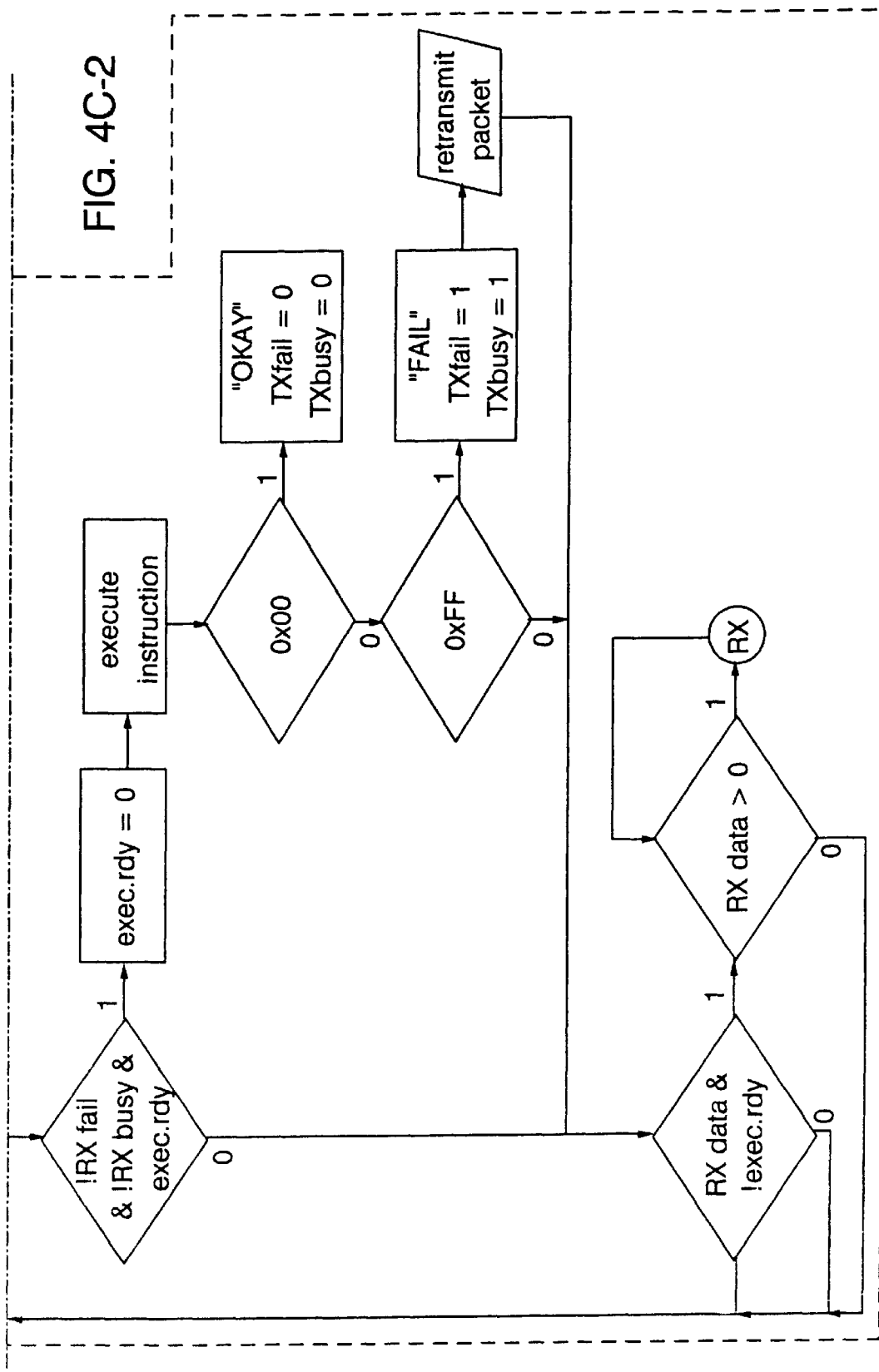

FIG. 5

| FIG. 5A |
|---|
| FIG. 5B |

FIG. 5A

| INST | Instruction | Description | |
|---|---|---|---|
| 0x01 | WRITE_VSGREG | write directly to video register | |
| 0x02 | DRAW_POINT | draw a point on the screen | |
| 0x03 | DRAW_HORIZ_LINE | draw a horizontal line | |
| 0x04 | DRAW_VERT_LINE | draw a vertical line | |
| 0x05 | DRAW_BOX | draw a box | |
| 0x06 | PAINT_BOX | fill in a box | |
| 0x07 | PAINT_PATTERN | fill in a box with a bitmap | |
| 0x08 | MOVE_BLOCK | copy a block | drawing packets |
| 0x09 | LOAD_PALLETTE16 | load a 16 (4 bit) color palette | |
| 0x0A | LOAD_PALLETTE256 | load a 256 (8 bit) color palette | |
| 0x0B | BOX_STRING | draw a box with text | |
| 0x0C | BOX_3DSTRING | draw a 3D box with text | |
| 0x0D | SCROLL_UP | scroll text up | |
| 0x0E | SCROLL_DOWN | scroll text down | |
| 0x0F | GO_TO_XY | set cursor coordinates | |
| 0x10 | CLEAR_SCREEN | clear the screen | |
| 0x11 | CLEAR_SCROLL | clear scroll buffer | |
| 0x12 | PUT_CHAR | put a character onto the screen | |
| 0x13 | PUT_STRING | write text to the screen | |
| 0x14 | PRINTF | write text to the screen (standard C) | |
| 0x15 | LOAD_FONT | load a font directly to video memory | |
| 0x16 | VSG_INIT | initialize the video processor with default values | |
| 0x17 | VSG_WRITE | write directly to the video processor | |
| 0x18 | DRAW_3DBOX | draw a 3D box | |
| 0x19 | EXPAND_3DBOX | expand a 3D box, "pop up" | |

FIG. 5B

| | | |
|---|---|---|
| 0x65 | FG_COLOR | set foreground color attribute |
| 0x66 | BG_COLOR | set background color attribute |
| 0x67 | SHOW_TRANSPARENT | set transparency attribute (for PRINTF) |
| 0x68 | XCHAR_SPACING | set character spacing in the horizontal direction |
| 0x69 | YCHAR_SPACING | set character spacing in the vertical direction |
| 0x6A | CURSOR_X | set cursor X coordinate |
| 0x6B | CURSOR_Y | set cursor Y coordinate |
| 0x6C | XCURSOR_LEFT | set auto-text boundary for upper left (for PRINTF) |
| 0x6D | YCURSOR_TOP | set auto-text boundary for upper left (for PRINTF) |
| 0x6E | XCURSOR_RIGHT | set auto-text boundary for lower right (for PRINTF) |
| 0x6F | YCURSOR_BOTTOM | set auto-text boundary for lower right (for PRINTF) |
| 0x70 | TIMEOUT1_MAX | set time-out for resending a packet |
| 0x71 | TIMEOUT2_MAX | set time-out for disturbances in receiving data stream |
| 0x72 | KEY_NO_REPEAT_FLAG | set keyboard repeat |

} control packets

| | | |
|---|---|---|
| 0x00 | OK | packet was received OK |
| 0xFF | NOT_OK | packet FAIL |
| 0xFE | KEYSTROKE | send a keystroke |
| 0xFD | ABORT_PACKETS | abort sent (usually clear all buffers and go to menu) |
| 0xFC | FINISHED_OPERATION | last packet, all done for now |
| 0xFB | DIAGNOSTICS | various sub-functions here for diagnosis, etc. |
| 0xFA | MACRO | various sub-functions here for doing other operation, or if instruction set is completely full |

} status packets

FIG. 6

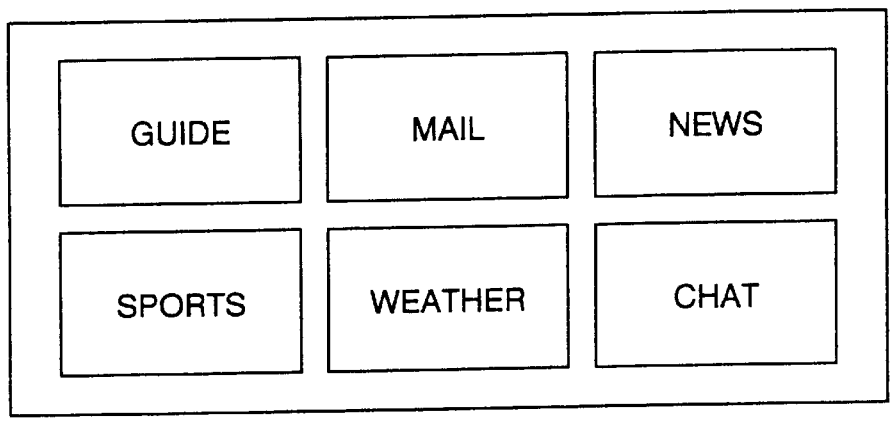

FIG. 7

| Thu | 8:00P | 8:30p | 9:00P |
|---|---|---|---|
| ABC | High Incident || Murder One |
| CBS | Diagnosis Murder || Maloney |
| NBC | Friends | Single Guy | Seinfeld |
| FOX | << Major League Baseball Playoffs NLCS Game 7 >> |||
| SCFI | Star Trek V: The Final Frontier (Sci Fi ***) >> |||
| HBO | << French Kiss (Com ) || The Net (Sus) >> |
| CNN | Prime News | Politics | Larry King Live >> |
| TBS | << Who's The Man (Com-Dra **) || National Geographic |
| USA | Murder She Wrote || Cape Fear >> |
| TWC | Weather Scope | 5-Day Planner | Michelin Driver's |
| CURRENT | FAVORITES | OPTIONS | Th 10/10 8:04PM |

FIG. 8

| | | | |
|---|---|---|---|
| The Net | Thu | 10/10 9:00P | HBO |

Suspense, 1995 *** PG-13 (A,L,V) 1:52 (CC)
Dolby
Sandra Bullock, Jerry Northam

A reclusive computer expert is plunged into hi-tech intrigue when she comes into possession of a top secret program

| OTHER TIMES | REMIND ME | PREVIOUS |
|---|---|---|

FIG. 9

| The Net Suspense, 1995 *** PG-13 |
|---|
| Saturday 10/19 9:00P HBO |
| Sunday 10/20 8:00P HBO |
| Tuesday 10/22 11:00P HBO |
| Wednesday 10/23 8:00P Max |
| Friday 10/25 7:00P HBO |
| Saturday 10/26 9:00P Max |
| Sunday 10/27 11:00P Max |

| REMIND ME | PREVIOUS | CLOSE |
|---|---|---|

FIG. 12

| All | Fitness | Skiing |
|---|---|---|
| Auto Racing | Football | Soccer |
| Baseball | Golf | Tennis |
| Basketball | Hockey | Track & Field |
| Boating | Horse Racing | Water Sports |
| Bowling | Hunting & Fishing | Wrestling |
| Boxing | Motorcycle Racing | Miscellaneous |
| Equestrian | | |

|  | PREVIOUS | CLOSE |
|---|---|---|

FIG. 13

| Sports | Football | | |
|---|---|---|---|
| 1:00P | Sat | ABC | College Football FSU at NC State |
| 1:00P | Sun | NBC | San Diego Chargers at Miami Dolphins |
| 1:00P | Sun | FOX | Dallas Cowboys at Washington Red |
| 3:00P | Sun | FOX | Minnesota Vikings at San Francisco |
| 3:00P | Sun | TNT | Indianapolis Colts at Buffalo Bills |
| 9:00P | Mon | ABC | Kansas City Chiefs at Houston Oilers |

| REMIND ME | PREVIOUS | CLOSE |
|---|---|---|

FIG. 14

Search

Enter the search string/sub-string:

| PREVIOUS | OK | CANCEL |
|---|---|---|

FIG. 15

| Search Results for : Net |
|---|
| The Net (Sus **) Saturday 10/19 9:00P HBO |
| NBA: NJ Nets at Chicago Bulls Sunday 10/19 2:00P NBC |
| Internet Cafe Sunday 10/19 4:00P MTV |
| The Net (Sus **) Sunday 10/20 8:00P HBO |
| Internet Cafe Tuesday 10/22 2:00A MTV |
| The Net (Sus **) Wednesday 10/23 8:00P Max |
| [ REMIND ME ]  [ PREVIOUS ]  [ CLOSE ] |

FIG. 16

Choose Favorite Channels

| ABC ✓ | |
| CBS ✓ | To view more channels, move up/down using arrow buttons |
| CNN | |
| FOX | ✓ - represents channel already in the favorites list |
| HBO ✓ | |
| NBC ✓ | |
| PBS | |

[         ]  [ OK ]  [ CANCEL ]

FIG. 17

Mail

[ CHECK MAIL ]  [ SEND MAIL ]  [ SETUP OPTIONS ]

FIG. 18

| No. | Date | From | Subject |
|---|---|---|---|
| 1 | | | |
| 2 | | | |
| 3 | | | |

[ REPLY ] [ FORWARD ] [ GO BACK ]

FIG. 19

To : Joe@superg.com
From : Jane@tripled.com
Subject : Test Mail
Date : Thu, 19 Jun 1996, 22:10:00

Joe:
   This is a test mail.
-Jane

[ <<PREVIOUS ] [ NEXT>> ] [ SHOW LIST ]

FIG. 20

| To: | Jane@tripled.com |
|---|---|
| From: | Joe@superg.com |
| Subject: | Test ... |
| Cc: | |
| Bcc: | |

This is a test message

-Joe

[ ] [ SEND ] [ CANCEL ]

FIG. 21

Mail Setup Options

| POP Account: | Joe@superg.com |
|---|---|
| SMTP Host: | Superg.com |
| Real Name: | Joe Hackett |
| Return Address: | Joe@superg.com |
| Check Mail Every | 30    Minutes |

Notify by: [ ] None    [ ] Sound
[X] Pop-Up Window

Dial-Up
| Phone No: | 123-4567 |
|---|---|
| User Name: | Joe |
| Password: | ******* |

[ ] [ OK ] [ CANCEL ]

FIG. 22

| Category | Headline |
|---|---|
| General | Baptists to Boycott Disney |
| Politics | Tobacco Talks in Crisis |
| World | Saudi Bomb Suspect Charged |

[ SETUP OPTIONS ] [ MAIL ] [ CLOSE ]

FIG. 23

News Setup Options

- General ✓
- Politics ✓
- World
- Entertainment ✓
- Computer
- Other

✓ - represents the category is

[ ] [ OK ] [ CANCEL ]

FIG. 24

| Sport | Headline |
|---|---|
| Basketball | Bulls Win NBA Championship |
| Baseball | Rangers Defeat Mariners |
| Football | Seahawks to Get a New Stadium |

[ ] [ MAIL ] [ SETUP OPTIONS ]

FIG. 29

| | Forecast | | |
|---|---|---|---|
| | Thu, 18 June, 1996 - Atlanta, GA | | |
| | | Hi | Low |
| Friday | | 86 | 75 |
| Saturday | | 84 | 72 |
| Sunday | | 89 | 73 |
| | | NEXT CITY | CLOSE |

FIG. 30

Choose your nickname:

[                    ]

[        ]  OK  CANCEL

FIG. 31

| Channel Name |
|---|
| #ABC |
| #CBS |
| #CNN |
| #FOX |
| #NBC |
| #PBS |
| #VH1 |

| Room | No. of People | Topic of Discussion |
|---|---|---|
| NBC1 | 23 | ER |
| NBC2 | 21 | Tonight Show |
| NBC3 | 25 | Seinfeld |
| NBC4 | 13 | Seinfeld |
| NBC5 | 19 | Days of Our Lives |
| NBC6 | 22 | Sunset Beach |

JOIN    CANCEL

FIG. 32

TV Program in progress

<nick1> Hi there....
<nick2> Hello.
<nick3 has joined**>

>Your message

METHODS AND SYSTEMS FOR PROVIDING TELEVISION RELATED SERVICES VIA A NETWORKED PERSONAL COMPUTER

FIELD OF THE INVENTION

The present invention relates to the field of television and more particularly to set top boxes for televisions.

BACKGROUND OF THE INVENTION

The television (TV) has become ubiquitous in modern society. As a result, a variety of services are being provided via TV. Many of the services are provided using a set top box that works in conjunction with the TV to provide the desired service. One example of a service provided via a TV is an online TV program guide, wherein TV program schedule information is displayed on a TV for searching and selection by a viewer. Online TV program guides are described in U.S. Pat. No. 4,751,578 to Reiter et. al. Entitled "System for Electronically Controllable Viewing on a Television Updateable Television Programming Information". Other popular services are also provided using a set top box. For example cable or satellite TV may be provided using a tuner packaged as a set top box. The tuner decodes the transmission from the service provider and formats the signal for display on the TV.

Personal computers (PCs) have also been widely accepted into consumer's homes for a wide range of uses. A popular use is access to the Internet, and the World Wide Web (the Web). The Web is an arrangement of uniform resource locators (URLs) on the Internet that, taken together, may provide a communications infrastructure for making services and products available to PC users.

Some of the services available over the Internet are provided using set top boxes. One example of such a service is WebTV. WebTV enables a user to browse the Web using a TV as the display. WebTV, however, duplicates much of the hardware and software included in a standard PC. For example, WebTV includes a modem while many PCs come equipped with one. Consequently, the consumer who already owns a PC may pay the cost of the modem twice: once when buying the PC and a second time when buying WebTV. Furthermore, WebTV may also duplicate a portion of the functions found in most TVs. This duplication of PC and TV components may make WebTV unnecessarily expensive or complex to the many consumers who already own a PC.

Information on the Internet may appear distorted when viewed on a TV. Information stored on the Internet may be formatted according to the aspect ratio of a computer display. A TV display, however, may not have the same aspect ratio as a computer display. Consequently, information from the Internet may appear distorted when viewed on a TV.

SUMMARY OF THE INVENTION

The present invention provides systems and methods which use a PC to access desired information while watching television. The information may be stored locally to the PC or on a network (e.g, the Internet). Lower cost may be achieved by utilizing a PC to access the information, thereby eliminating the duplication of hardware in the set top box.

A Set top box according to the present invention includes a remote control receiver that receives user commands from a wireless remote control unit. A radio frequency transceiver that transmits computer commands to the personal computer that may be connected to the Internet in response to the user commands and that receives data that is retrieved by the PC in response to the computer commands. A video processing system that processes the received data for display on a television and a television interface that displays the processed received data on the television.

Systems utilizing the present invention may be inexpensive compared to existing systems that duplicate hardware and software components found in many PCs and TVs. The present invention may use an existing PC to avoid replication, thereby allowing a reduction in the cost of the system. Moreover, the PC may be connected to the internet, avoiding further duplication and enabling access to networked resources. For example, the present invention may be utilized to access to the Internet so as to obtain information relevant to a specific television program currently being viewed or information independent of any particular program such as access to a chat-room.

Additionally, the television may be interfaced to the PC and the Internet by wirelessly receiving user commands at a set top box and then wirelessly relaying computer commands that represent the user commands from the set top box to a personal computer in response to the wirelessly received user commands. The computer commands cause the personal computer to access the Internet in response to the computer commands and receive data from the Internet at the personal computer. The information is then wirelessly relayed from the personal computer to the set top box where the information is formatted for display on a television that is connected to the set top box. The wireless connection may therefore avoid a physical connection between the PC and the television.

Furthermore, the wireless connection may allow the existing PC and the television to be located in separate areas of the user's home. For example, the wireless connection may allow the PC and the televsion to be located in different rooms or on different floors of the user's home.

The present invention may also be utilized to provide information likely to be desired while the viewer watches television. For example, the viewer may desire a listing of television programs and corresponding broadcast times, sports or weather information.

The present invention may also display information from the Internet along with television images on a television display. For example, the user may select a mode wherein a portion of the TV display is allocated to displaying TV images while another portion may be used for interactive services (e.g., E-mail or chat-room participation). The information from the Internet accessed by the user may be formatted in accord with the aspect ratio of the TV display so as to avoid the negative visual artifacts associated with the display of Internet information on a TV display.

Accordingly, an existing PC may be used in conjunction with the set top box to supply many of the functions that may be desired by a user while watching TV. Moreover, the set top box may use the PC in conjunction with the Internet to supply the desired functions rather than duplicating the functionality of the PC within the set top box. The user may access the information from a specific location on the Internet which is associated with the desired functions. For example, the user may desire program listings, sports scores, weather information, access to e-mail, or participation in a chat room that may concern a TV program presently being viewed by multiple users. By avoiding duplication of the PC functionality within the set top box, the present invention may provide a lower cost alternative to users who desire the above functions and already have a PC.

BRIEF DESCRIPTION OF THE DRAWINGS

FIG. 1C is an illustration of a TV display corresponding to a particular user command;

FIG. 3 is a flow chart illustrating an embodiment of the present invention;

FIGS. 4A, 4C, 4D, and 4E are flow charts illustrating a command protocol that may be utilized by the present invention;

FIG. 4B is a block diagram of a packet format utilized by the present invention;

FIG. 5 is a table of exemplary instructions and commands used in an embodiment of the present invention; and FIGS. 6 through 32 are examples of displays that may be used in a system utilizing the present invention.

DETAILED DESCRIPTION OF THE INVENTION

Figure 1A:
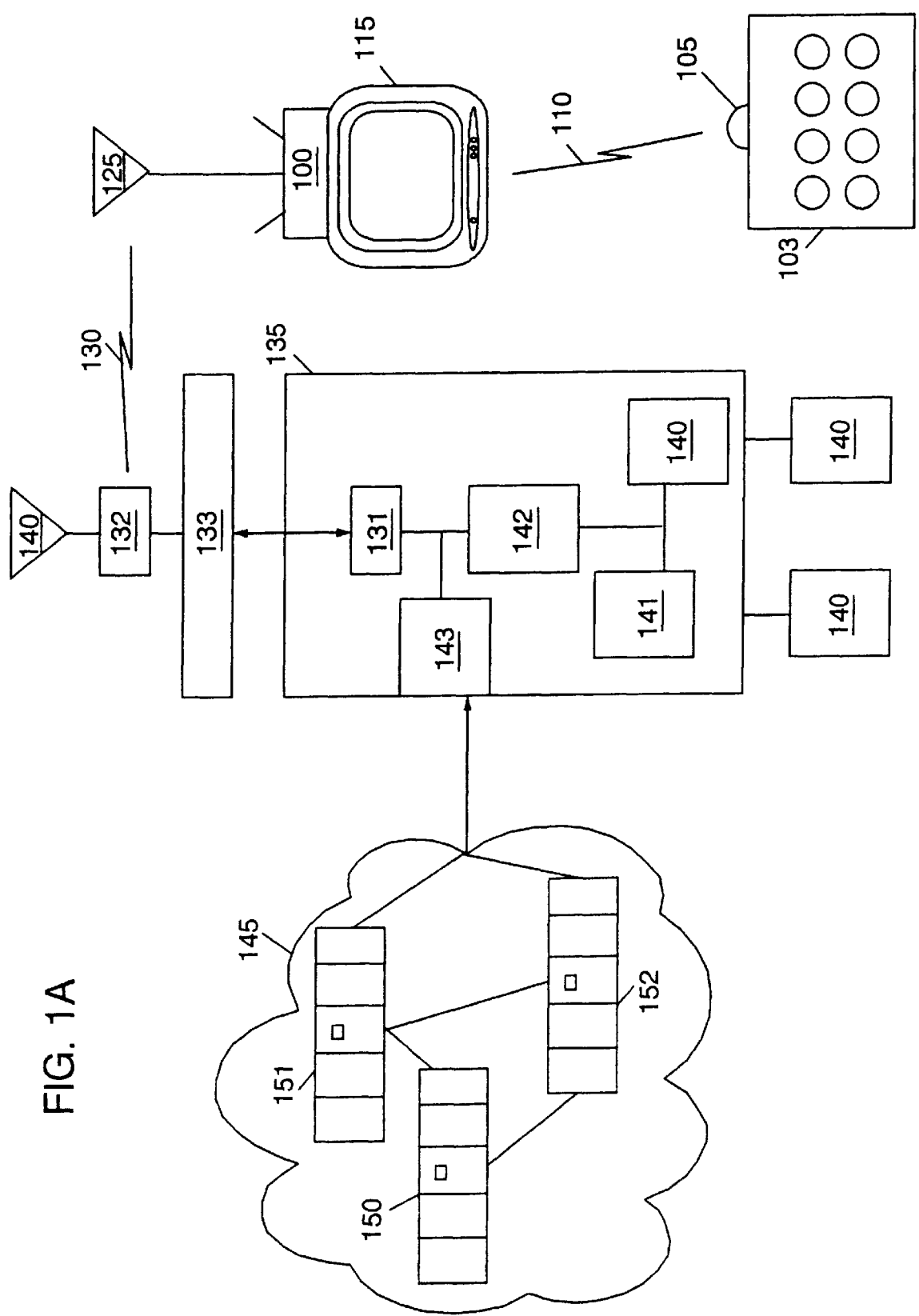
FIG. 1A is a block diagram of a system utilizing the present invention.

The present invention will now be described more fully hereinafter with reference to the accompanying drawings, in which a preferred embodiment of the invention is show. This invention may, however, be embodied in many different forms and should not be construed as limited to the embodiments set forth herein; rather these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

The present invention is also described using flowcharts. Those skilled in the art will understand that each block of the flowchart illustrations, and combinations of blocks in the flowchart illustrations, may be implemented with various commonly used communication system components. It will also be understood that portions of the operations described in the flowchart illustrations may be executed as computer program instructions loaded into a computer or other data processing apparatus, thus producing a machine which provides means for implementing the functions specified in the flowchart blocks and combinations thereof. The computer program may cause operational steps to be performed on the computer or data processing apparatus to produce a computer-implemented process such that the instructions which execute on the computer or data processing apparatus provide steps for implementing the functions of the flowchart blocks or combinations thereof. Accordingly, blocks of the flowchart illustrations support combinations of means for performing the specified functions and combinations of steps for performing the specified functions.

By utilizing the present invention, an existing PC may be used in conjunction with the set top box to supply many of the functions that may be desired by a user while watching TV. Moreover, the set top box may use the PC in conjunction with the Internet to supply the desired functions rather than duplicating the functionality of the PC within the set top box. The user may access the information from a specific location on the Internet which is associated with the desired functions. For example, the user may desire program listings, sports scores, weather information, access to e-mail, or participation in a chat room that may concern a TV program presently being viewed by multiple users. By avoiding duplication of the PC functionality within the set top box, the present invention may provide a lower cost alternative to users who desire the above functions and already have a PC.

FIG. 1A illustrates a system utilizing the present invention. A user may control the system with a wireless remote control 103. The wireless remote control 103 wirelessly transmits user commands to the system so as to control the display of information on a TV. The user commands are transmitted to the system by pushing corresponding buttons on the wireless remote control 103. A set top box 100 receives the user commands and determines if external information is required to execute the user command. If external data is required, a computer command is wirelessly relayed to a radio frequency transceiver 133 radio frequency transceiver 133 across a communications link 130. The received computer command is then transmitted to a PC 135. The PC 135 determines if data is required from a network 145 or if data may be obtained locally. If data is desired from the network 145, the data is returned to the PC 135 and the corresponding information is then wirelessly relayed, with any desired command, to the set top box 100 across the communications link 130 using the command protocol. If data may be obtained locally, the PC 135 transmits the corresponding information to the radio frequency transceiver 133 which wirelessly relays the corresponding information, with any desired command, across the communications link 130 to the set top box 100 using the command protocol. The set top box 100 then formats the information and command for display on the TV 115. For example, the returned information and command may describe a box that is to be drawn on the TV 115 while the data describes what the box drawn should contain.

Figure 1B:
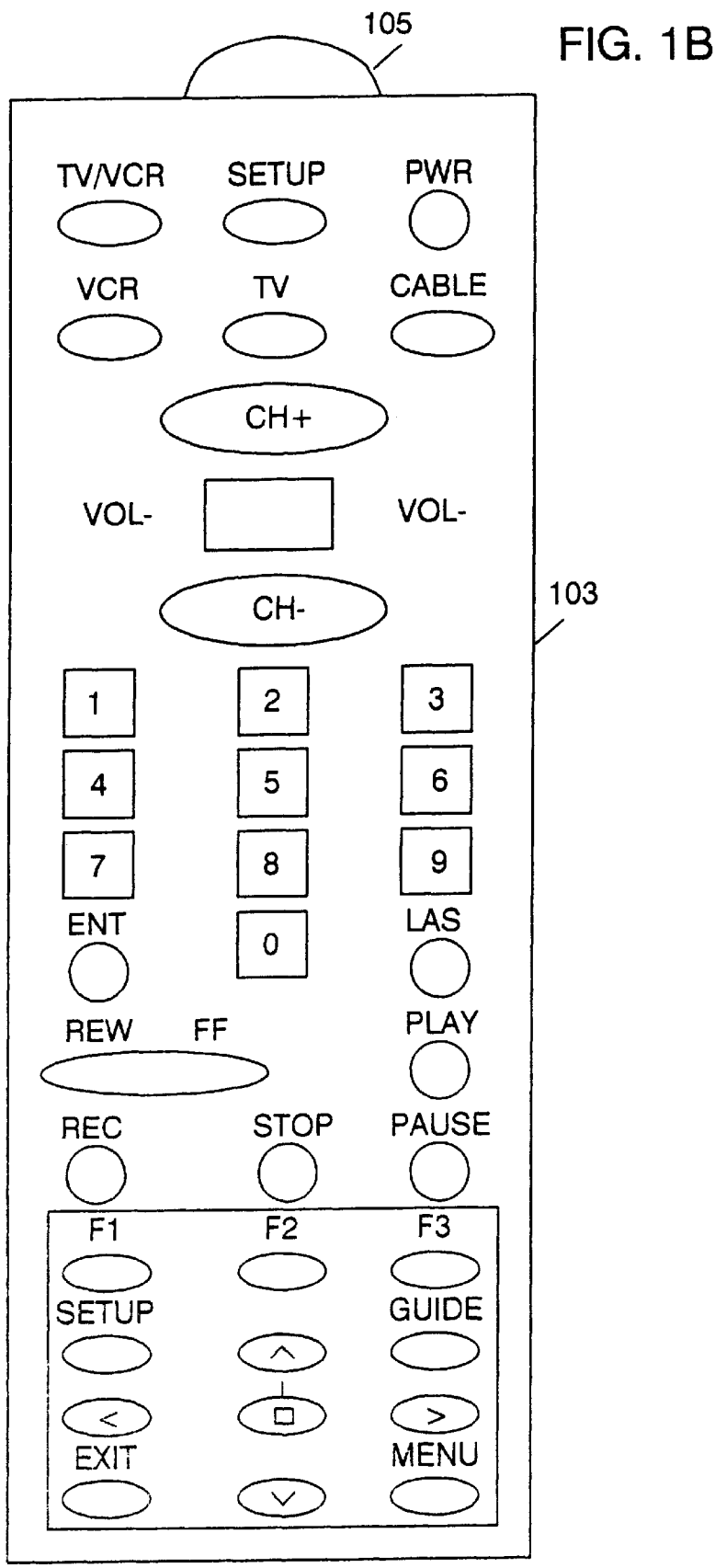
FIG. 1B is an illustration of a wireless remote control of FIG. 1A.

Referring to FIG. 1B, the wireless remote control 103 is capable of controlling a range of consumer electronic devices. For example, the wireless remote control 103 may be used to control a TV, a Video Cassette Recorder (VCR), and a cable tuner box. The wireless remote control 103 transmits commands over the communications link 110 to the wireless remote receiver 105. In the preferred embodiment, the communications link 110 uses infra-red light. Although the wireless remote control 103 is described in a handheld form, other devices may be used as the wireless remote control 103. For example, a keyboard with an infra-red interface may be substituted for the wireless remote 103 control described above.

The wireless remote control 103 includes a plurality of keys which may be designated as having an associated user command or data. When the user pushes a key, the associated user command or data is wirelessly transmitted to the set top box 100 across the communications link 110. A subset of the keys on the wireless remote control 103 may be designated as having a user command or data associated with it that is chosen specifically for the purpose of practicing the present invention. For example, FIG. 1B illustrates a guide button corresponding to a particular command which causes the screen shown in FIG. 1C to be displayed on the TV 115. FIG. 1B also shows a setup button for , a menu button for displaying the-top level menu, a set of directional button for navigating through the displays, an exit button for exiting the menu, and three "soft keys" for performing functions that may vary depending on the present state of the display. For example, if the guide button were pressed while displaying the menu shown in FIG. 1C, F1 may correspond to the CURRENT button, F2 may correspond to the FAVORITES button and F3 may correspond to the OPTIONS button (i.e., Press F1 for CURRENT, press F2 for FAVORITES and Press F3 for OPTIONS).

The set top box 100 receives the user commands from the wireless remote control 103 via the communications link 110. The set top box 100 controls the display of information on the TV 115 in response to the user commands. When the user selects particular information for display on the TV 115, the set top box 100 formats the TV 115 display so that the information is displayed according to the user command. For example, FIG. 1C illustrates an exemplary display of information in response to a user command corresponding to a TV program guide describing broadcast times for programs. Although FIG. 1C shows a full screen display of information, other modes may be used. For example, a partial display mode may also be used wherein the information described above appears on a first portion of the display while a second portion of the TV 115 is used to display other information (e.g., video from a TV program).

The set top box 100 displays the information described above by relaying computer commands and receiving corresponding information with an antenna 125 according to the command protocol described herein. The user commands received from the wireless remote control 103 are processed by the set top box 100 to determine what action is necessary to display the desired information. If the set top box 100 requires information not available within set top box 100, the set top box 100 wirelessly relays a corresponding computer command using the radio transceiver and an antenna 125. Commands are relayed using the command protocol structured as packets containing instructions and data concerning the information to be displayed.

A communications link 130 is a UHF radio frequency signal which carries information between the set top box 100 and a radio frequency transceiver 133. In the preferred embodiment, the communications link 130 operates using a carrier frequency of 900 Mhz.

The radio frequency transceiver 133 receives and transmits information over the communication link 130 using a radio transceiver 132 and an antenna 140. The operation of the radio transceiver 132 and the antenna 140 is similar to those associated with the set top box 100. The radio frequency transceiver 133 relays the computer commands received from the set top box 100 to the PC 135. The radio frequency transceiver 133 also receives information from the PC 135 for relay to the set top box 100. The radio frequency transceiver 133 translates information between the serial data format and the radio signal format described above. The radio frequency transceiver 133 may be implemented external to the PC 135 with a dedicated power source or internally within the PC 135.

The radio frequency transceiver 133 communicates with the PC 135 through a serial data interface 131. The serial data interface 131 is a bi-directional communications device commonly found in a personal computer. Information received from the radio frequency transceiver 133 may be communicated to the PC 135 via the serial data interface 131. Similarly, information may be communicated from the radio frequency transceiver 133 to the PC 135 via the serial data interface 131.

The PC 135 is a computer capable of running a wide range of applications software and may consist of a CPU 142, a memory 141, a network communications device 143, a hard disk drive 140, a keyboard 139, a monitor 138 and other hardware and software components commonly found in personal computers. For example, the PC 135 may be implemented using a Pentium microprocessor marketed by Intel running the Windows 95 Operating System marketed by Microsoft Inc. The PC 135 processes the computer command received from the set top box 100 and the corresponding information according to the command protocol. A computer program running on the PC 135, receives information from the radio frequency transceiver 133 for transmission to a network 145. The computer program also accepts data from the network 145 for relay to the set top box 100 through the radio frequency transceiver 133. The computer program running on the PC 135 formats the information to be returned to the set top box 100 in accordance with command protocol.

The network 145, including a collection of computers (i.e., a computer 150, a computer 151, and a computer 152), may represent the Internet. Data that is of particular interest to users of the system may be stored at particular locations on the Internet. The data on the Internet is accessed using the computer commands relayed by the set top box 100 to the PC 135. The information is then relayed to the set top box 100 for processing or formatting for display on the TV 115. The network 145 described above may also be a local area network, Internet 2, or similar configuration enabling the distribution and storage of data. In one embodiment, the PC 135 may used in standalone mode wherein the PC 135 does not access the network 145.

Figure 2:
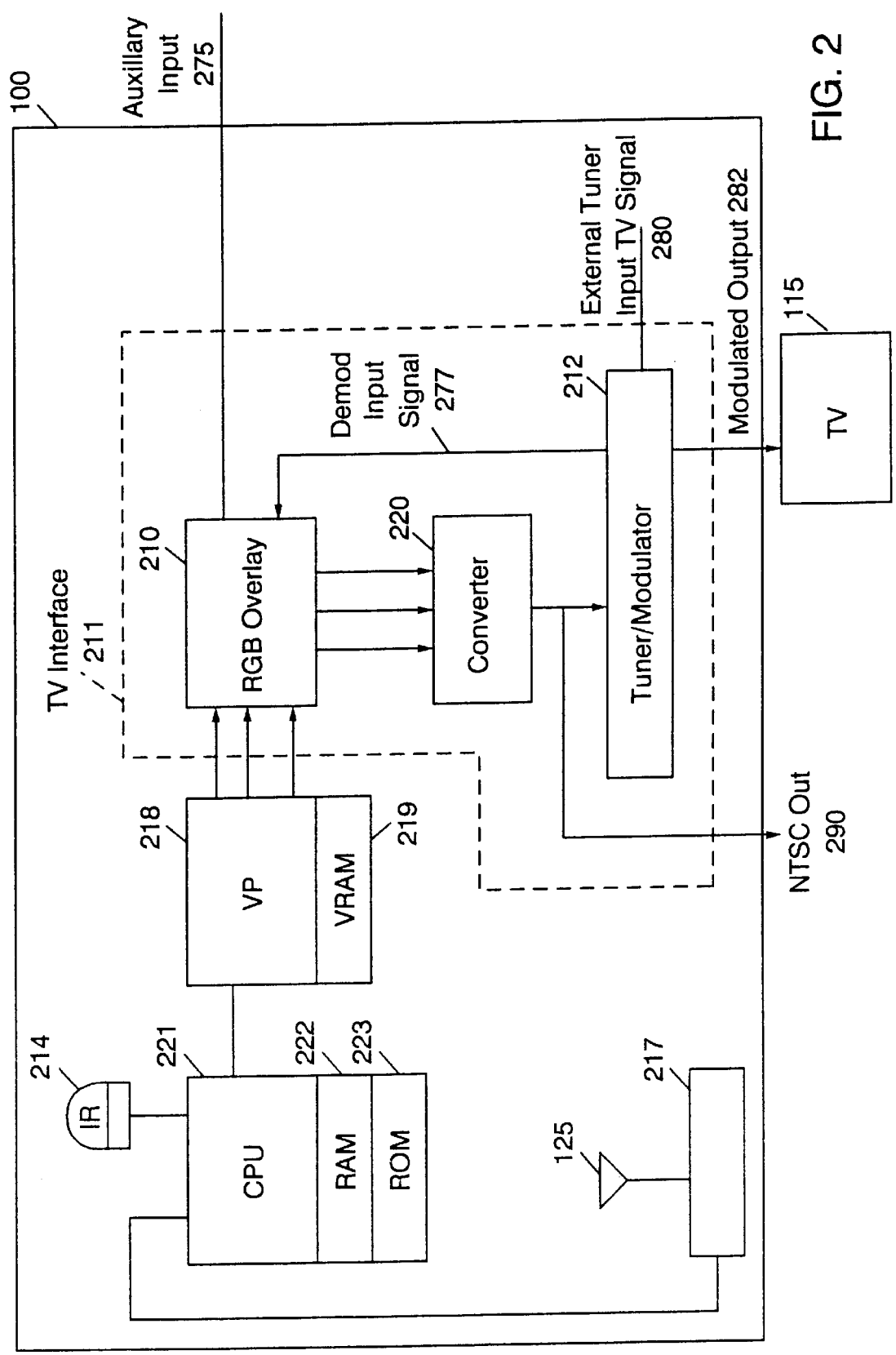
FIG. 2 is a block diagram of an embodiment of the present invention.

Referring to FIG. 2, the set top box 100 will now be described in greater detail. The set top box 100 accepts user commands from the wireless remote control 103, wirelessly relays computer commands corresponding to the user commands to the PC 135, receives information corresponding to the computer commands, processes and formats the corresponding information for display on the TV 115 in accordance with the user command.

The set top box 100 includes a central processing unit (CPU) or controller 221 a Random Access Memory (RAM) 222, a Read Only Memory (ROM) 223, a Video Processing system (VP) 218, a Video Buffer (VRAM) 219, a TV interface 211 including an Overlay 210, a Converter 220, and a Tuner/Modulator 212, a radio Frequency Transceiver (RFT) 217, an antenna 125 and a wireless infra-red (IR) sensor 214. These individual components are well known to those having skill in the art and need not be described further herein.

The CPU 221 may be suitable for running a computer program to process information from the PC 135, processes user commands from the wireless remote control 103, control the formatting of information for display on the TV 115, and provide general system services to the set top box 100. The CPU 221 may process user commands received from the wireless remote control 103 as a stream of serial data. For example, if the user pushes a button on the wireless remote control that corresponds to a command requiring information from the network 145, the CPU 221 receives the command in an internal serial buffer from the IR sensor 215. The CPU 221 sends a corresponding computer command to the RFT 217 and the command is transmitted over communications link 130 to the PC 135 and the network 145. The CPU 221 may also process information from the PC 135. For example, when information is returned from the network 145, it is received by the RFT 217. The CPU 221 accepts the information from the RFT 217 as a stream of serial data. In one embodiment, the CPU 221 may processes the data received from the wireless remote control 103 and information from the PC 135 and the network 145 as a single serial data stream.

The CPU 221 may also control the combination of RGB formatted data associated with information from the PC 135. RGB formatted data represents display information corresponding to the intensity of each color component for a particular pixel within an image. For example, the R component corresponds to the Red intensity of the pixel, the G corresponds to the green intensity of the pixel, and the B component corresponds to the blue intensity of the pixel. When the three components are displayed simultaneously, the pixel exhibits a color made up of the three intensity components. If the user has issued a user command requesting that TV program listings be displayed on the TV 115 simultaneously with a TV program, the CPU 221 may transmit the appropriate RGB data to the Overlay 210 for combination with the NTSC signal. The CPU 221 may be implemented using a Cold Fire CF5306 marketed by Motorola Inc., however, analogous microprocessors known to those skilled in the art may also be used.

The VP 218 may be used by the CPU 221 to control the combination of information from the PC 135 with a TV signal for display on the TV 115 or select between the two for display. The data from the VP 218 may be represented in RGB format wherein a first portion of the data represents red information, a second portion represents green information, and a third portion represents blue information. The VP 218 may be implemented with a YVG606 Video Processor manufactured by Yamaha Inc.

The Overlay 210 may be used to combine RGB data from the VP 218 with the TV signal. The TV signal may be derived from an auxiliary input 275, a demodulated version of the external tuner input TV signal 280, demodulated input signal 277, provided by the Tuner/Modulator 212. The RGB formatted data may be combined with a TV signal formatted according to the NTSC standard (i.e., a signal format for display of images on a TV). The Overlay produces an RGB formatted composite of the RGB data from the VP 218 and the TV signal. The Overlay 210 may be implemented using a video mixer marketed by Toshiba, Inc.

The Converter 220 converts the composite RGB signal produced by the Overlay 210 to an NTSC composite signal which may be displayed on a TV monitor directly. The Converter 230 may be implemented using a RGB to NTSC converter marketed by Sony, Inc.

The Tuner/Modulator 212 selects an NTSC composite formatted signal from the Converter 220 or an external tuner input TV signal 280 and formats the selected signal as a modulated.signal for input into a TV tuner. The Tuner/Modulator 212 may also provide a demodulated version of the external tuner input TV signal 280 to the Overlay 210. The Tuner/Modulator 212 may be implemented using a tuner/modulator marketed by Panasonic, Inc.

The radio Frequency Transceiver (RFT) 217 transmits user commands from the set top box 100 to the PC 135 using a radio signal. The RFT 217 also receives information from the PC 135 for processing and formatting by the set top box 100 using a radio signal. The RFT 217 is FCC part 15 compliant and may be implemented with two RFM 9901s and an RFM 9902 manufactured by Radio Frequency MicroDevices Inc.

The wireless IR sensor 214 receives user commands from the wireless remote control 103 over communications link 110. The wireless IR sensor 214 provides the relayed user commands from the wireless remote control 103 to the CPU 221 for processing. The user commands are processed by the CPU 221 as a serial data stream.

Referring to FIG. 3, overall operations of a system utilizing the present invention will now be described. The operation of the system begins when the user presses a button on the wireless remote control 103 (Block 300). As described above, the button pushed corresponds to a user command which carries out a function desired by the user. The user command is transmitted across the communications link 110 to the wireless remote control receiver 120 (Block 305). The relayed command is placed in a serial input buffer for service and an interrupt is generated to the CPU 221. The CPU determines the nature of the user command and relays a corresponding computer command to the radio frequency receiver 217, across the communication link 130 to the radio frequency transceiver 133 (Block 310).

The radio frequency transceiver 133 transfers the relayed computer command to the PC 135 via the Serial Interface Unit 131. If the PC 135 is connected to the Internet (Block 311), the PC 135 accesses the Internet (Block 315) and receives the data required by the computer command (Block 320). If the PC 135 is not connected to the Internet (Block 311), the required data may be retrieved locally (Block 313). For example, information may be provided via a CD-ROM and accessed locally by the PC. Alternatively, an Internet connection may be established.

The received data is then formatted in accordance with the command protocol (Block 325) and the PC 135 relays the information corresponding to the received data across the communication link 130 to the set top box 100 (Block 330). The set top box processes and formats the received information for display on the TV 115 connected to the set top box 100 (Block 335), completing the process (Block 340).

Referring to FIGS. 4A, 4B, 4C, 4D, and 4E a command protocol and the packet format used to transfer data between the set top box 100 and the PC 135 will now be described in greater detail. Information relayed between the set top box 100 and the PC 135 may be structured according to the packet format illustrated in FIG. 4B. The packet format includes a START byte, an ID word, an INSTR byte, a LENGTH word, a number of DATA bytes, a CKSUM word, and a STOP byte. The Start byte signals the start of the packet. In a particular embodiment, the START byte is the hexadecimal value 0xFF. The ID word is the least significant word of the set top box's serial number. The INSTR byte is the instruction or command to be executed by the set top box 100. The LENGTH word is the number of bytes contained in the DATA field. The DATA is a number of data bytes associated with the INSTR field. For example, if a particular command or instruction has associated data or parameters, the data is stored in the DATA field. The number of data bytes included in the DATA field is described by the LENGTH field. The CKSUM is the least significant word of the sum of each byte contained in the INSTR, LENGTH, and DATA fields. The STOP byte signals the end of the packet. In a particular embodiment, the STOP byte is the hexadecimal value 0xFF.

Figure 4A:
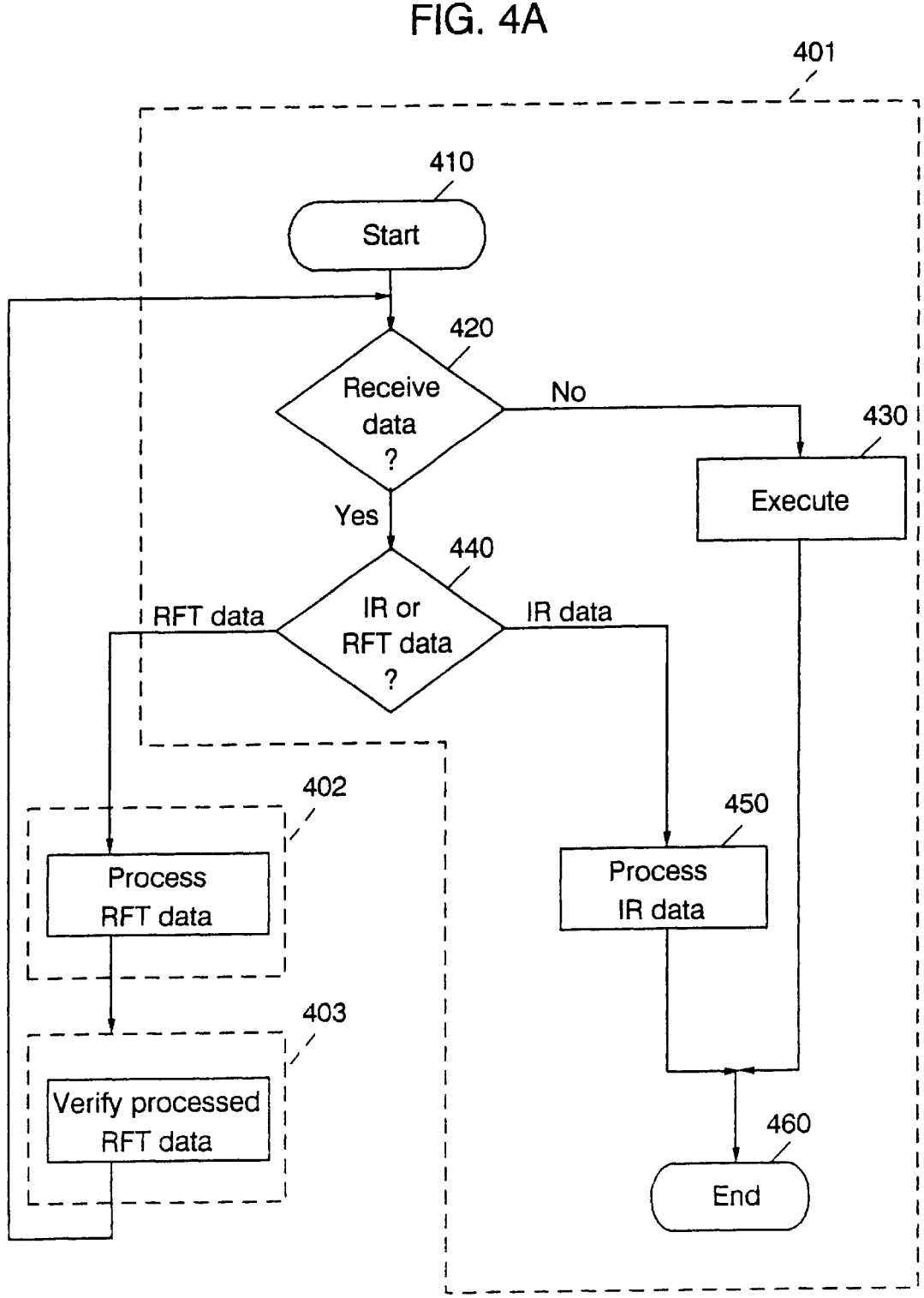

As shown in FIG. 4A, the command protocol may be separated into three blocks or modules (Block 401, Block 402, and Block 403). The process begins in Block 410 when incoming data is received. The received data is identified (Block 420) as user command data from the wireless remote control 103 or information from the PC 135 (Block 440), user command data is processed and transmitted to the PC 135 (Block. 450). Information from the PC 135 is processed in Block 402. Block 401 also executes commands from the PC 135 after processing (Block 402) and verification (403).

When a serial input interrupt occurs, an interrupt vector routine stores the incoming command in a receive buffer for later processing (Block 420). Incoming information from the PC 135 is also stored in a receive buffer (Block 420). There may be one receive buffer for each serial input (i.e., the RFT 217 and wireless IR sensor 214).

As the receive buffer is processed, a flag is set if a valid packet is received (Block 420). The data may be a user command from the wireless IR sensor 214 input (i.e., the keyboard or wireless remote control 103), or information from the RFT 217 input from the PC 135. If an IR input is valid (Block 440), it is queued up, packetized, and transmitted to the PC 135 (Block 450). A flag is set to wait for that packet to be received. If a time-out or FAIL occurs, the packet is resent. If an OKAY instruction is returned from the PC 135, the transmitted user command was received by the PC 135 and the flag is cleared (Block 450). FIG. 4C illustrates a particular embodiment of processing the user command data and execution of information from the PC 135.

Figure 4D:
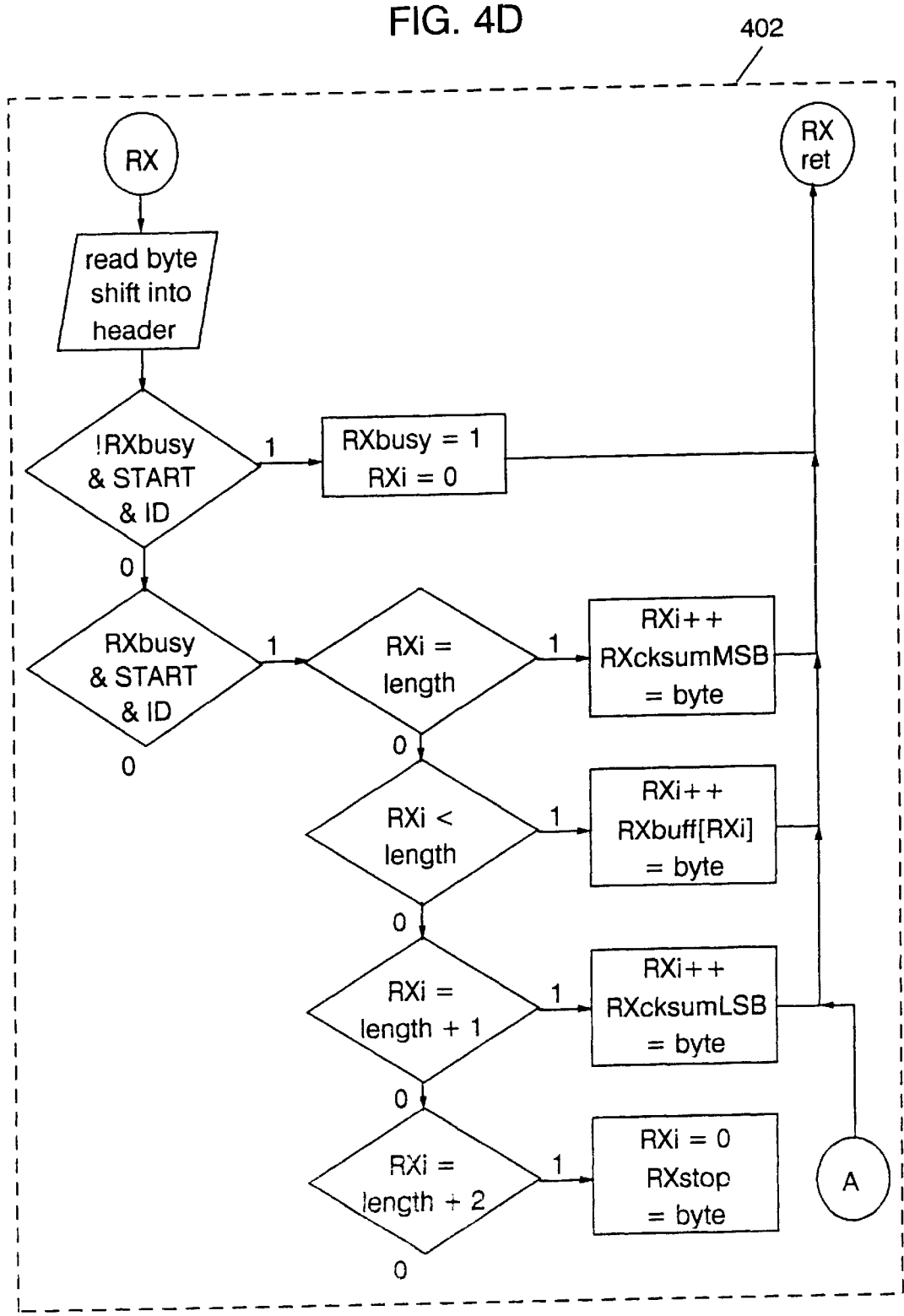

If information is received from the PC 135 (Block 440), the receive packet routine is called (Block 402) wherein the information is shifted into a packet. A flag is set if a packet header matches. While the flag is set, the information is stored in the various sections for a number of bytes. Next, the CKSUM and STOP fields are read. The flag may be reset by either an error or time-out. FIG. 4D illustrates a particular embodiment of formatting and processing described above.

Figure 4E:
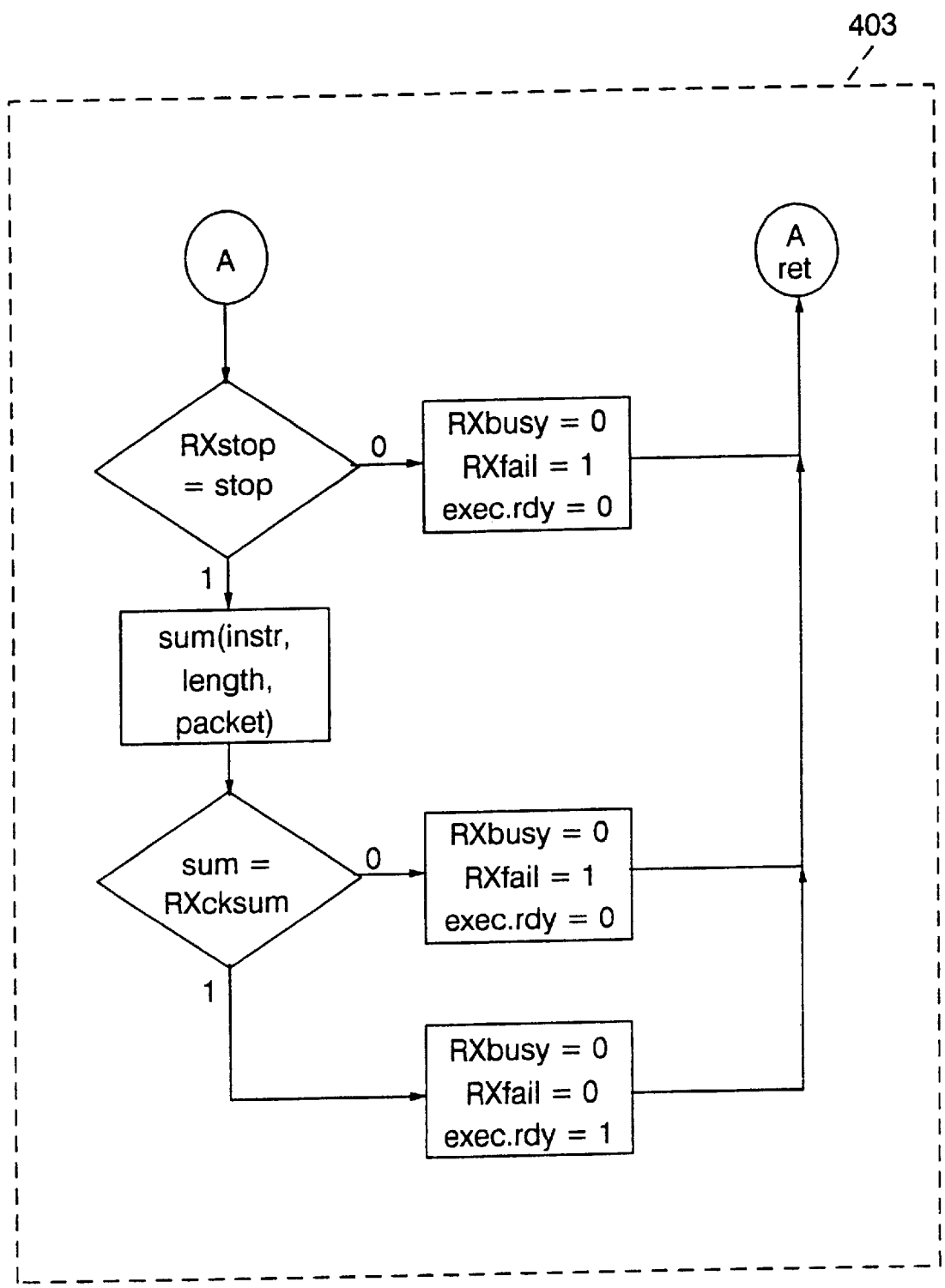

The formatted and processed information is then verified (Block 403). The checksum is calculated and compared. The STOP byte is also compared. Flags are set to show status. If an execution flag is set, the instruction is executed later (Block 430). When the instruction is executed, an OKAY packet is sent back. A FAIL packet is sent if the header matched, but the rest of the packet was bad. FIG. 4E illustrates a particular embodiment of the verification process described above.

FIG. 5 is a list of instructions and commands that may be used in a system utilizing the present invention. The instructions and commands shown in FIG. 5 may be transmitted as information from the PC 135 to the set top box 100 so as to carry out the user commands desired by the user. The instructions and commands shown in FIG. 5 may be grouped according to the function each instruction or command provides when transmitted to the set top box. The drawing packets control what elements are drawn on the TV display. The control packets determine how the elements included in the drawing packets will be displayed. The status packets signal the status on the drawing and control packets sent from the set top box.

A particular example will now be discussed in greater detail. When the user pushes the menu button on the wireless remote control 103, the menu shown in FIG. 6 is displayed on the TV 115. The display is accomplished by a series of instructions relayed to the set top box 100 that correspond to the menu button. Specifically, the PC 135 relays a SHOW_TRANSPARENT instruction followed by a BG_COLOR instruction, followed by a CLEAR_SCREEN instruction. These instructions are used to control the drawing of information on the TV 115. A second series of instructions (i.e., drawing packets) is then relayed to the set top box 100. Specifically, a DRAW_3DBOX instruction is transmitted followed by a PAINT_BOX instruction. These instructions draw on the TV 115. Finally, a third set of instructions is relayed to the set top box 100. Specifically, a GO_TO_XY instruction is sent followed by a SET_FG_COLOR instruction followed by a PRINTF instruction. This series of instructions controls the information displayed in the boxes drawn on the TV 115.

FIGS. 6 through 32 illustrate a set of exemplary commands and displays that may appear in a system utilizing the present invention. As described above, the system may include selecting a service, displaying and using a program guide and its various options, using an Email service to check/send Email, using a news service to browse the latest news, using a sports service to know the latest sports news, using a weather service to see the current weather and the forecast, and using a Chat service to communicate with other people over the network.

Selecting a Service

1. When the MENU button on the remote/keyboard is pressed, the screen shown in FIG. 6 may be displayed:
2. The arrow buttons may then be used to highlight a choice and press ENTER.

Guide

Displaying the Program Guide

1. Highlight GUIDE from the System's main menu and press ENTER or Press GUIDE button on the remote.
2. The Program Guide Screen is displayed as shown in FIG. 7.
3. The first program in the first row of FIG. 7 is highlighted initially on the Program Guide Screen. For example, "High Incident" will be highlighted initially in the above screen.

Moving Through the Program Guide

1. The arrow buttons may be used to scroll through the Program Guide (i.e., press right arrow button to move right, left arrow button to move left, up arrow button to move up and down arrow button to move down).
2. As the Guide scrolls, the appropriate event is highlighted to show the current location on guide.
3. If the Guide scrolls out of the current time-span, pressing the CURRENT button will return the Guide to the present time. For example, in FIG. 7 if the Guide scrolls to the right to 12 AM, the Guide may return to 8 PM by pressing the CURRENT button.

Getting More Information on an Event

1. To see more details on any event, scroll to that event and press Enter. For example, if "The Net" is selected and Enter is pressed, the display in FIG. 8 is shown.
2. Pressing REMIND ME will add/remove the selected event to the reminders list.

Note: See the section "Using the REMIND ME option" for more information

3. Pressing PREVIOUS will return the Guide the Program Guide Screen.
4. Pressing OTHER TIMES will display the additional times this program is ON. For example, if OTHER TIMES is pressed in FIG. 8, the following is displayed.
5. Pressing REMIND ME will add/remove the selected event to/from the reminders list.

Note: See the section "Using the REMIND ME option" for more information.

6. Pressing PREVIOUS will return the Guide to the previous screen.
7. Pressing CLOSE will return the Guide the Program Guide Screen.

Using the REMIND ME Option

The REMIND ME feature may be used to remind the user of the programs selected, just before their starting times. To do this, First add the programs desired to a reminders list. For every event in the reminders list, the System displays a message on the TV screen 5 minutes before its starting time. If the System is used to change channels, it will automatically change channels one minute before the starting time of the events in the reminders list.

Figure 10:
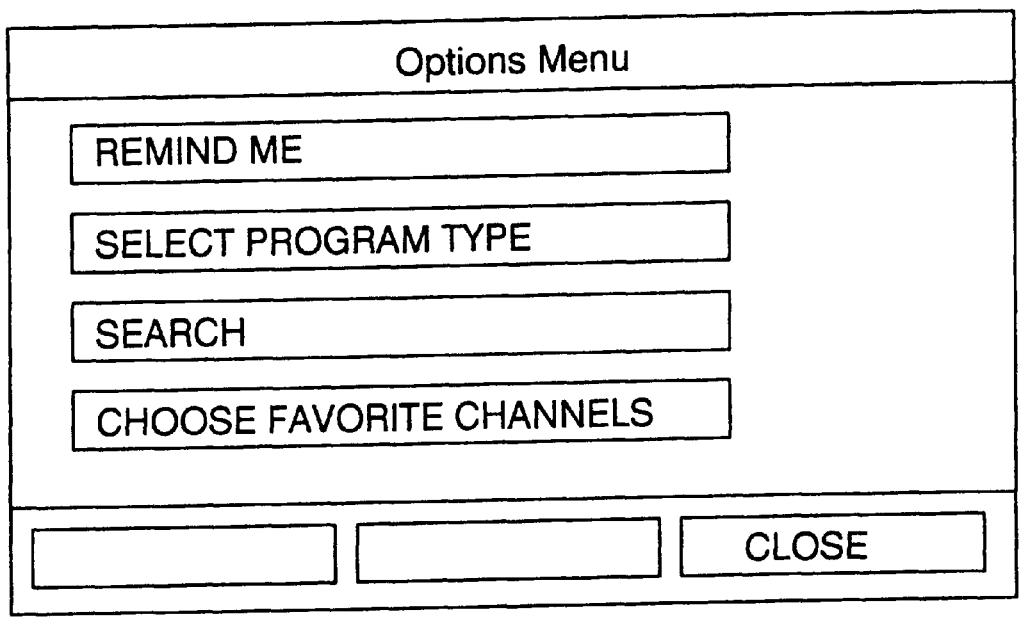

To use the REMIND ME feature from the Program Guide Screen do the following:

1. Press the GUIDE button on the remote. The Program Guide Screen is displayed as shown in FIG. 7.
2. Highlight the desired program by scrolling to it using arrow buttons.
3. Press the OPTIONS button. The OPTIONS menu screen is displayed as shown in FIG. 10.
4. Select the REMIND ME Option and Press ENTER.

Note: If the event is already in the reminders list, it is deleted from the list.

1. Follow Steps 1 & 2 given above to select an event on the Program Guide Screen.
2. When the desired event is highlighted press Enter. A screen showing additional information on the program is displayed. For example, if "The Net" is selected from the Program Guide Screen shown in FIG. 7, the screen shown in FIG. 8 is displayed.
3. Pressing the REMIND ME button on this screen will add the event to the reminders list.

Note:

1. If the event is already in the reminders list, it is deleted from the list.
2. Events may also be added to the reminders list by pressing the REMIND ME button on any screen that pops up with a REMIND ME option while using the System.

View Listings of Favorite Program Type

Figure 11:
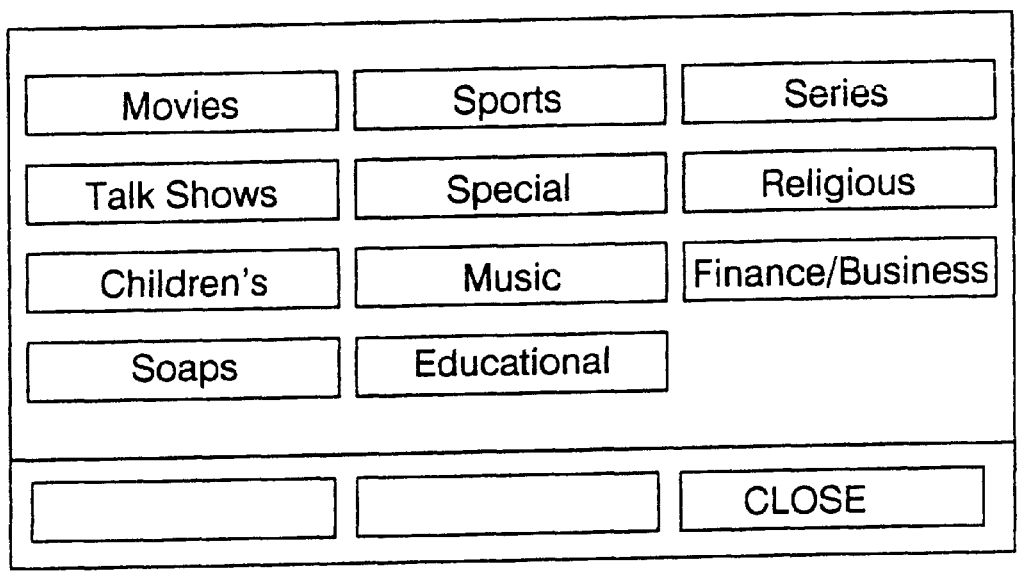

1. Press the OPTIONS button on the Program Guide Screen. The "Options Menu" screen is displayed as shown in FIG. 10.
2. Scroll to the SELECT PROGRAM TYPE option using arrow buttons and press ENTER. The screen shown in FIG. 11 is displayed.
3. Select a program type and press ENTER. If movies/sports is selected, another screen is displayed allowing a category of movie/sport to be selected. For example, if sports is selected, the screen shown in FIG. 12 is displayed.
4. Choose a category and press ENTER. The appropriate events are displayed in the ascending order of date & time. For example, if you select "Football" the screen in FIG. 13 is displayed.
5. Selecting REMIND ME on this screen, adds the event currently highlighted to the reminders list and ensures prompting at the starting time of this event. If the event is already in the list, it is deleted from the list.

Searching the Listings

It is possible to use the search option of the System to search the listings for a program. To use the SEARCH feature do the following:

1. Press the GUIDE button on the remote. The Program Guide Screen shown in FIG. 7 is displayed.
2. Press the OPTIONS button on the Program Guide Screen. The "Options Menu" screen shown is FIG. 10 is displayed.
3. Scroll to the SEARCH option using the arrow buttons and press ENTER. The search screen is displayed as shown in FIG. 14.
4. Enter a search string and press OK to see the events containing the search string. For example, if the word "Net" is entered in the search box, all the programs with the word "Net" in their title are displayed as shown in FIG. 15.
5. It is possible to search the listings for movies by entering the actor's name. If only a part of an actor's name is given, then all the movies of the actors with that part in their name are reported. For example, if searching for "Tom", all movies of "Tom Hanks", "Tom Cruise", etc. would be returned.

Choosing Favorite Channels

1. Press the GUIDE button on the remote. The Program Guide Screen is displayed as shown in FIG. 7.
2. Press the OPTIONS button on the Program Guide Screen. The "Options Menu" screen is displayed as shown in FIG. 10.
3. Scroll to the CHOOSE FAVORITE CHANNELS option using arrow buttons and press ENTER. The screen, consisting of the channel names, is displayed as shown in FIG. 16.
4. Use arrow buttons to highlight a particular channel.

Note: To view more channels, move up/down using arrow buttons.

5. Press ENTER to add/remove the selected channel to/from the favorite channels list. If the channel is already in the favorites list, it is removed from it when ENTER is pressed (the check mark next to it will disappear). Otherwise, it will be added to the list (the check mark will appear next to it).
6. Press OK to accept the changes (or) CANCEL to ignore them.

View the Program Guide with Only the Favorite Channels

1. Press the GUIDE button. The Program Guide Screen is displayed as shown in FIG. 7.
2. Press the FAVORITES button on the Program Guide Screen.
3. The program guide is displayed with listings for only the users favorite channels.

Mail

The Mail feature lets the user send/receive e-mail messages.

Checking Email:

1. Press the MENU button on the remote/keyboard. The main menu screen is displayed as shown in FIG. 6.
2. Select MAIL from the main menu screen and press ENTER. The screen shown in FIG. 17 is displayed.
3. Select CHECK MAIL and press ENTER.
4. The "Mail Inbox" is displayed with copies of the new e-mail messages and displayed as shown in FIG. 18.
5. To view a message, use the arrow buttons to select it and press ENTER. The message is displayed as shown in FIG. 19.
6. To Reply to (or) Forward an e-mail, go to the "Mail Inbox", select the message and press the appropriate button.

Sending an Email:
1. Press the MENU button on the remote/keyboard. The main menu screen is displayed as shown in FIG. 6.
2. Select MAIL from the main menu screen. The following screen is displayed as shown in FIG. 17.
3. Select SEND MAIL option and press ENTER.
4. The screen shown in FIG. 20 is displayed allowing the user to compose an e-mail message.
5. Use "tab key" to move between the fields.
6. After typing the message, press the SEND button to send it.
7. Press CANCEL to cancel sending the e-mail.

Setup Options:
1. Press the MENU button on the remote/keyboard. The main menu screen is displayed as shown in FIG. 6.
2. Select MAIL from the main menu screen and press ENTER. The screen shown in FIG. 17 is displayed.
3. Select SETUP OPTIONS and press ENTER. The following screen shown in FIG. 21 is displayed.
4. Enter the appropriate information. If the user has a direct connection, the Dial-Up Information may not be necessary.
5. Press OK to accept the changes.
6. Press CANCEL to ignore the changes. News Reading News:
1. Press the MENU button on the remote/keyboard. The main menu screen is displayed as shown in FIG. 6.
2. Select NEWS from the main menu screen and press ENTER. The screen shown in FIG. 22 is displayed
3. To view a news item, scroll to it using arrow buttons and press ENTER.
4. To e-mail a news item, select the news item and press the MAIL button.

Setting News Options:
The News feature consists of different news categories. The user may customize the news service by going into the news options and selecting/deselecting various categories. The follow instructions set the news options:
1. Press the MENU button on the remote/keyboard. The main menu screen is displayed as shown in FIG. 6.
2. Select NEWS and press ENTER. The screen shown in FIG. 22 is displayed.
3. Press the SETUP OPTIONS Button. The screen shown in FIG. 23 is displayed:
4. Use arrow buttons to scroll to a category and highlight it.
5. Press ENTER to Select/Deselect it. If the category is already selected, it is deselected when pressing ENTER (the check mark next to it will disappear). Otherwise, it will be selected (the check mark will appear next to
6. Press OK to accept the changes (or) CANCEL to ignore them.

Sports
Reading Sports:
1. Press the MENU button on the remote/keyboard. The main menu screen is displayed as shown in FIG. 6.
2. Select SPORTS from the main menu screen and press ENTER. The screen shown in FIG. 24 is displayed
3. To view a sports item, scroll to it using arrow buttons and press ENTER.
4. To e-mail a sports item, select it and press the MAIL button.

Figure 25:
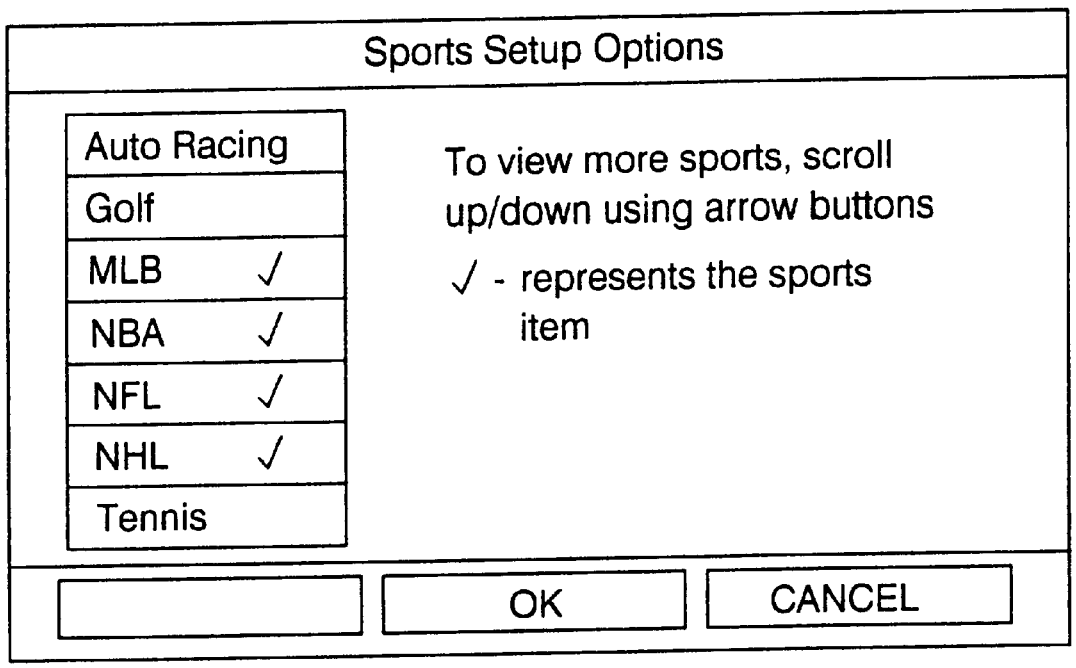

Setting Sports Options
The Sports feature provides news on various sports. The user may customize the sports news service by going into the sports options and selecting/deselecting various sports. Follow the instructions below to set the news options:
1. Press the MENU button on the remote/keyboard. The main menu screen is displayed as shown in FIG. 6.
2. Select SPORTS from the main menu screen and press ENTER. The screen shown in FIG. 24 is displayed.
3. Press the SETUP-OPTIONS button. The screen shown in FIG. 25 is displayed.
4. Use arrow buttons to scroll to a sports category and highlight it.
Note: To view more sports, scroll up/down using arrow buttons.
5. Press ENTER to Select/Deselect it. If the category is already selected, it is deselected when pressing ENTER (the check mark next to it will disappear). Otherwise, it will be selected (the check mark will appear next to
6. Press OK to accept the changes (or) CANCEL to ignore them.

Figure 26:
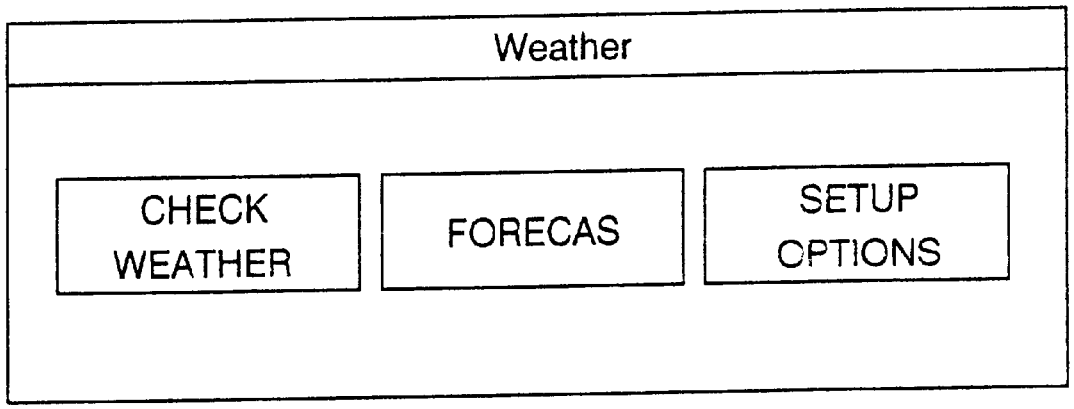
Figure 27:
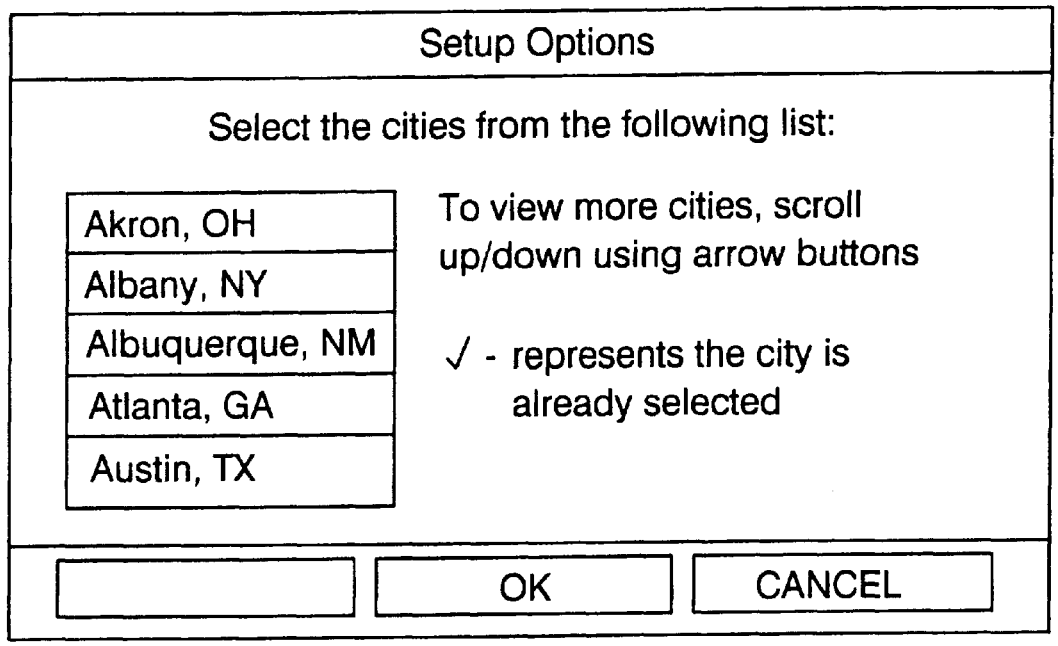

Weather
Setting Weather Options:
1. Press the MENU button on the remote/keyboard. The main menu screen is displayed as shown in FIG. 6.
2. Select WEATHER from the main menu screen and press ENTER. The screen shown in FIG. 26 is displayed.
3. Select SETUP OPTIONS and press ENTER. The screen showing a list of various cities is displayed as shown in FIG. 27.
4. Use arrow buttons to scroll to a city and highlight it.
Note: To view more cities, scroll up/down using arrow buttons.
5. Press ENTER to Select/Deselect a city. If the city is already selected, it is deselected when pressing ENTER (the check mark next to it will disappear). Otherwise, it will be selected (the check mark will appear next to it).
6. Press OK to accept the changes (or) CANCEL to ignore them.

Figure 28:
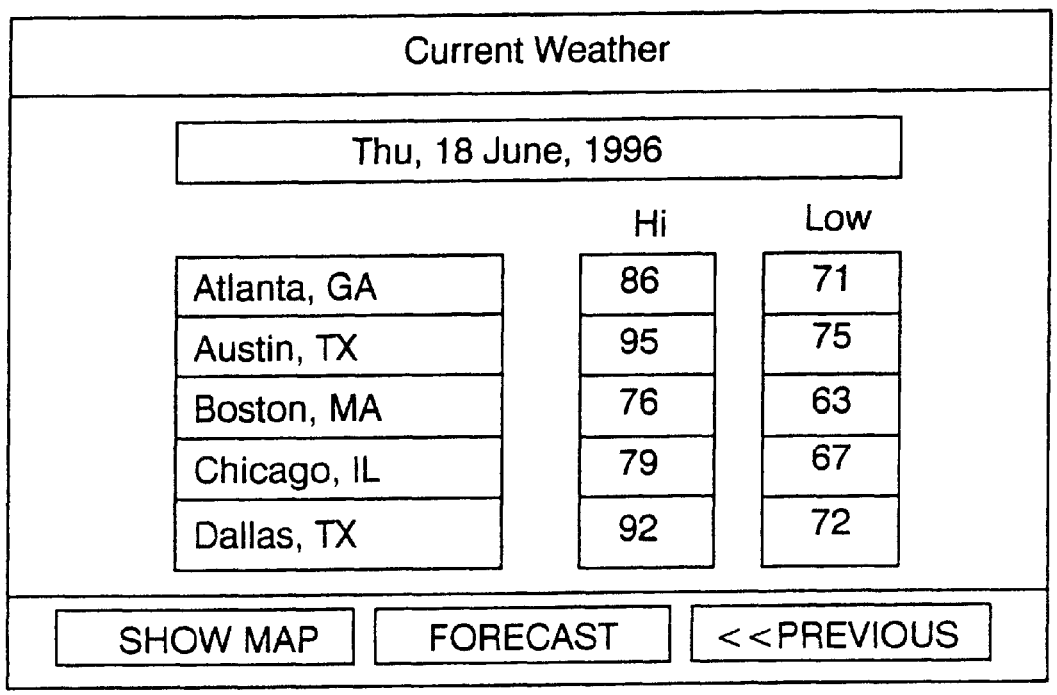

Checking Current Weather
1. Press the MENU button on the remote/keyboard. The main menu screen is displayed as shown in FIG. 6.
2. Select WEATHER from the main menu screen and press ENTER. The screen shown in FIG. 26 is displayed.
3. Select CURRENT WEATHER and press ENTER. The current weather is displayed for the city chosen as shown in FIG. 28.
4. To view more cities, scroll up/down using arrow buttons.
5. Press SHOW MAP to see a U.S. weather map.
6. Press FORECAST to see the weather forecast of the city currently highlighted.

Checking the Forecast:
1. Press the MENU button on the remote/keyboard. The main menu screen is displayed as shown in FIG. 6.
2. Select WEATHER from the main menu screen and press ENTER. The screen shown in FIG. 26 is displayed.
3. Select FORECAST and press ENTER. The weather forecast is displayed for the first city chosen as shown in FIG. 29.

4. Press NEXT CITY to see the forecast for the next city in the selected cities list.

Chat

The chat feature allows the user to communicate with different people over the Internet while watching TV.

1. Press the MENU button on the remote/keyboard. The main menu screen is displayed as shown in FIG. 6.
2. Select CHAT on the main menu screen and press ENTER. The screen shown in FIG. 30 is displayed.
3. Enter the user's nickname and press OK. If the nickname chosen is already being used by another user, the user will be prompted to choose another nickname
4. If the nickname is valid, the user will see a list of channels each consisting of various chat rooms displayed as shown in FIG. 31.
5. Use arrow buttons to select a channel. The chat rooms related to that channel will appear on the right section.
6. Use tab key to shift between channel names and chat rooms.
7. Scroll to a favorite chat room using arrow buttons and click on JOIN. The user will see the ongoing discussion on your screen. The user may type a message in the box below the discussion area as shown in FIG. 32.
8. To exit, press EXIT button.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A set top box that interfaces a television and a personal computer that is connected to the Internet, the set top box comprising:
    a wireless remote control receiver that receives user commands from a wireless remote control unit;
    a wireless radio frequency transceiver that wirelessly transmits computer commands to the personal computer that is connected to the Internet in response to the user commands and that wirelessly receives data that is generated from the internet via the personal computer in response to the computer commands, wherein the data includes at least one drawing command;
    a video processing system that processes the wirelessly received data for display on a television; and
    a television interface that displays the processed received data on the television, wherein the television interface simultaneously displays the processed received data and a television program on the television.

2. A set top box according to claim 1 wherein the television interface overlays the processed received data on a television program.

3. A set top box according to claim 1 wherein the wireless remote control receiver is an infrared remote control receiver.

4. A set top box according to claim 1 in combination with a personal computer that is connected to the Internet, wherein the wireless radio frequency transceiver comprises a first radio frequency transceiver, the personal computer including a second wireless radio frequency transceiver that wirelessly receives the computer commands from the first wireless radio frequency transceiver and that wirelessly transmits the data that is generated from the Internet to the first wireless radio frequency transceiver.

5. A set top box according to claim 1 in combination with a television that is connected to the television interface.

6. A set top box according to claim 1 in combination with a wireless remote control unit that wirelessly relays user commands to a television and to the set top box.

7. A set top box according to claim 6 wherein the wireless remote control unit is a wireless computer keyboard.

8. A method for interfacing a television to the Internet comprising the steps of:
    wirelessly receiving user commands at a set top box;
    wirelessly relaying computer commands that represent the user commands from the set top box to a personal computer in response to the wirelessly received user commands;
    causing the personal computer to access the Internet in response to the computer commands;
    receiving data from the Internet at the personal computer;
    wirelessly relaying information representing the received data from the personal computer to the set top box, wherein the information includes at least one drawing command; and
    formatting the information for display on a television that is connected to the set top box, wherein the television simultaneously displays the received data and a television program on the television.

9. A method according to claim 8:
    wherein the step of causing the computer to access the Internet comprises the step of causing the personal computer to access a location which is associated with the set top box; and
    wherein the step of receiving data from the Internet comprises the step of receiving data from the location that is associated with the set top box.

10. A method according to claim 9 wherein the receiving step comprises the step of receiving sports scores from the location that is associated with the set top box.

11. A method according to claim 9 wherein the receiving step comprises the step of receiving data that is formatted for display on a television rather than a computer monitor, from the location which is associated with the set top box.

12. A method for interfacing a television to the Internet comprising the steps of:
    wirelessly receiving user commands at a set top box;
    wirelessly relaying computer commands that represent the user commands from the set top box to a personal computer in response to the wirelessly received user commands;
    causing the personal computer to access the Internet in response to the computer commands;
    receiving data from the Internet at the personal computer;
    wirelessly relaying information representing the received data from the personal computer to the set top box;
    formatting the information for display on a television that is connected to the set top box; and
    wherein the step of wirelessly relaying information representing the received data from the personal computer to the set top box comprises the step of wirelessly relaying drawing commands from the personal computer to the set top box.

13. A method according to claim 12 wherein the formatting step comprises the step of converting the drawing commands into a video signal for display on a television.

14. A method according to claim 13 wherein the converting step is followed by the step of combining the video signal with a television program signal to produce a combined video signal for display on a television.

15. A method for interfacing a television to the Internet comprising the steps of:

wirelessly receiving user commands at a set top box;

wirelessly relaying computer commands that represent the user commands from the set top box to a personal computer in response to the wirelessly received user commands;

causing the personal computer to access the Internet in response to the computer commands;

receiving data from the Internet at the personal computer;

wirelessly relaying information representing the received data from the personal computer to the set top box;

formatting the information for display on a television that is connected to the set top box; and wherein said step of wirelessly relaying information representing the received data from the personal computer to the set top box comprises the steps of:

wirelessly relaying a control packet from the personal computer to the set top box so as to format the display of a drawing packet;

wirelessly relaying a drawing packet from the personal computer to the set top box so as to draw on the TV display; and wirelessly relaying a status packet from the set top box to the personal computer so as to report on the status of the drawing packet.

16. A system that interfaces a television and a personal computer that is connected to the Internet, the system comprising:

a wireless remote control unit that wirelessly transmits user commands;

a set top box comprising:

a wireless remote control receiver that receives the user commands from the wireless remote control unit;

a first radio frequency transceiver that transmits computer commands to the personal computer that is connected to the internet in response to the user commands and that receives data that is generated from the internet via the personal computer in response to the computer commands, wherein the data received at the first radio frequency transceiver includes at least one drawing command;

a video processing system that processes the received data for display on a television; and a television interface that displays the processed received data on the television, wherein the television interface simultaneously displays the processed received data and a television program on the television;

a second radio frequency transceiver for connection to the personal computer to receive the computer commands from the first radio frequency transceiver and to transmit the data that is generated from the internet; and a computer program for execution in the personal computer, the computer program comprising computer readable instructions that direct the computer to obtain the data from the Internet in response to the computer commands.

17. The system according to claim 16, wherein the television interface overlays the processed received data on a television program.

18. The system according to claim 16 wherein the wireless remote control receiver is an infrared remote control receiver.

* * * * *